(12) United States Patent
Bruestle et al.

(10) Patent No.: US 10,563,726 B2
(45) Date of Patent: Feb. 18, 2020

(54) DRIVE UNITE FOR A MOTOR VEHICLE

(71) Applicant: Neander Motors AG, Kiel (DE)

(72) Inventors: Claus Bruestle, Nordheim (DE); Lutz W. Lester, Emkendorf (DE)

(73) Assignee: Neander Motors AG, Kiel (DE)

( * ) Notice: Subject to any disclaimer, the term of this patent is extended or adjusted under 35 U.S.C. 154(b) by 119 days.

(21) Appl. No.: 15/793,286

(22) Filed: Oct. 25, 2017

(65) Prior Publication Data
US 2018/0112738 A1  Apr. 26, 2018

(30) Foreign Application Priority Data

Oct. 25, 2016 (DE) ......................... 10 2016 012 710
Aug. 10, 2017 (DE) ......................... 10 2017 007 552

(51) Int. Cl.
*F16F 15/30* (2006.01)
*B60K 17/344* (2006.01)
(Continued)

(52) U.S. Cl.
CPC ............ *F16F 15/30* (2013.01); *A01B 51/026* (2013.01); *B60K 5/02* (2013.01); *B60K 17/28* (2013.01); *B60K 17/34* (2013.01); *B60K 17/344* (2013.01); *B60K 17/35* (2013.01); *F02B 75/065* (2013.01); *F02B 75/225* (2013.01); *F02B 75/32* (2013.01);
(Continued)

(58) Field of Classification Search
CPC ........... F16F 15/30; B60K 5/02; B60K 17/28; B60K 17/34; B60K 17/35; F02B 75/065; F02B 75/225; F02B 75/32
See application file for complete search history.

(56) References Cited

U.S. PATENT DOCUMENTS 2,915,133 A    12/1959 Kraus
3,017,783 A *  1/1962 Van Der Brugghen ..................... F16H 61/66263
                                                                    474/14
(Continued)

FOREIGN PATENT DOCUMENTS

DE    2 160 430        7/1972
DE    195 15 515 A1    11/1995
(Continued)

OTHER PUBLICATIONS

European Search Report dated Mar. 16, 2018, Ten (10) pages.

*Primary Examiner* — Joseph M Rocca
*Assistant Examiner* — Michael R Stabley
(74) *Attorney, Agent, or Firm* — Crowell & Moring LLP

(57) ABSTRACT

A drive unit is situated between a first wheel axle and a second wheel axle and has an internal-combustion engine with a crankshaft system including a horizontally oriented crankshaft, which crankshaft acts upon a continuously variable transmission system which drives wheels of the first wheel axle and of the second wheel axle. The crankshaft is caused to rotate by at least one piston of the engine. The crankshaft interacts with a first set of V-pulleys of the transmission system, which first set of V-pulleys, by way of a first drive shaft, is connected with a first differential of the first wheel axle. The first set of V-pulleys, by way of an endless member, is in an operative connection with a set of V-pulleys which, with the interposition of a second drive shaft, influences a second differential of the second wheel axle.

6 Claims, 3 Drawing Sheets

(51) Int. Cl.
*F02B 75/22* (2006.01)
*F02B 75/06* (2006.01)
*B60K 17/28* (2006.01)
*B60K 17/34* (2006.01)
*A01B 51/02* (2006.01)
*B60K 5/02* (2006.01)
*B60K 17/35* (2006.01)
*F02B 75/32* (2006.01)

(52) U.S. Cl.
CPC ......... *B60Y 2400/72* (2013.01); *F02B 75/221* (2013.01); *F02B 2275/18* (2013.01)

(56) References Cited

U.S. PATENT DOCUMENTS

| | | | |
|---|---|---|---|
| 3,017,785 A * | 1/1962 | Van Der Brugghen | F16H 61/66263 477/40 |
| 3,331,464 A | 7/1967 | Van Doorne | |
| 3,613,816 A * | 10/1971 | Gutbrod | B60K 17/28 180/234 |
| 5,527,225 A | 6/1996 | Dick | |
| 6,086,492 A * | 7/2000 | Nakano | F16H 55/563 474/14 |
| 6,182,784 B1 | 2/2001 | Pestotnik | |
| 6,904,994 B2 * | 6/2005 | Coutant | B60K 11/02 180/291 |
| 7,377,351 B2 * | 5/2008 | Smith | B60K 17/354 180/233 |
| 8,512,181 B2 * | 8/2013 | Mitsubori | F16H 9/18 123/2 |
| 2007/0144283 A1 | 6/2007 | Hasegawa et al. | |

FOREIGN PATENT DOCUMENTS

| | | |
|---|---|---|
| DE | 10 2011 104 496 B4 | 12/2012 |
| DE | 10 2011 104 496 B4 | 2/2014 |
| DE | 10 2016 013 288 A1 | 5/2018 |
| EP | 0 319 747 A1 | 6/1989 |
| GB | 1 337 619 | 11/1973 |
| GB | 2 349 417 A | 4/1999 |
| JP | H02200526 A | 8/1990 |
| RU | 2 089 739 C1 | 9/1997 |

* cited by examiner

DRIVE UNITE FOR A MOTOR VEHICLE

CROSS REFERENCE TO RELATED APPLICATIONS

This application claims priority under 35 U.S.C. § 119 from German Patent Applications Nos. 10 2016 012 710.4, filed Oct. 25, 2016, and 10 2017 007 552.2, filed Aug. 10, 2017, the entire disclosures of which are herein expressly incorporated by reference.

BACKGROUND AND SUMMARY OF THE INVENTION

The invention relates to a drive unit for a motor vehicle having an all-wheel drive which is designed, for example, for use in the agriculture and construction sectors and/or for civil and disaster protection tasks.

A motor vehicle that has a high off-road capability is known from U.S. Patent Document U.S. Pat. No. 3,331,464. For driving the motor vehicle, an internal-combustion engine is used, which is arranged between a front axle and a rear axle. The internal-combustion engine having a centrifugal clutch acts by means of a drive shaft extending transversely with respect to the longitudinal direction of the vehicle and an angle drive upon a first V-pulley set of a CVT transmission. Its second V-pulley set is connected with a transmission which, on the one side, is in an operative connection with the rear axle and, on the other side, is in an operative connection with the front axle, so that the motor vehicle has a four-wheel drive.

From U.S. Patent Document U.S. Pat. No. 2,915,133, a motor vehicle of the sports car or racing car type is known, which has an internal-combustion engine between the wheel axles. The internal-combustion engine installed close to a front axle has cylinder banks that are arranged in a V-shape and extend diagonally toward the right vehicle side. A crankshaft of the internal-combustion engine, which extends in the longitudinal direction of the motor vehicle, drives the front axle and the rear axle by way of transmissions.

German Patent Document DE 2 160 430 relates to an equipment carrier constructed in the style of a tractor. An internal-combustion engine drives the front wheels and the rear wheels. In this case, an internal-combustion engine is installed between a front axle and a rear axle, and a first cardan shaft connects the front axle with the rear axle. A second cardan shaft extends between a transmission interacting with the internal-combustion engine and the rear axle. For achieving a defined ground clearance of the equipment carrier, both cardan shafts extend laterally past an engine mount of the internal-combustion engine.

It is an object of the invention to provide a drive unit for a motor vehicle having an all-wheel drive, by means of which a motor vehicle can be used in a versatile manner. However, in this case, it should also be ensured that the internal-combustion engine and the transmission device with drive shafts for the wheels of driving axles of the drive unit, on the one hand, can be implemented at acceptable expenditures and, on the other hand, are distinguished by good functioning.

According to the invention, this and other objects are achieved by a drive unit for a motor vehicle having an all-wheel drive, the drive unit being situated between a first wheel axle and a second wheel axle and having an internal-combustion engine with a crankshaft system comprising at least one horizontally oriented crankshaft. The crankshaft acts upon a continuously variable transmission system which drives wheels of the first wheel axle and of the second wheel axle. The crankshaft of the crankshaft system is caused to rotate by at least one piston of the internal-combustion engine and interacts with a first set of V-pulleys of the transmission system. The first set of V-pulleys, by way of a first drive shaft, is connected with a first differential of the first wheel axle. The first set of V-pulleys, by way of an endless member, is in an operative connection with a second set of V-pulleys which, with the interposition of a second drive shaft, influences a second differential of the second wheel axle.

The principal advantages achieved by the invention are that the interaction of the crankshaft of the crankshaft system of the internal-combustion engine with the first set of V-pulleys and its connection with the first drive shaft as well as the drive of the second set of V-pulleys by the first set of V-pulleys as well as the influencing of the second drive shaft by the second continuously variable transmission create exemplary technical prerequisites for the drive unit. On the one hand, these are distinguished by a simple implementability. On the other hand, a motor vehicle designed in such a fashion provides excellent services for use in the agriculture and construction sectors but also for civil and disaster protection tasks.

This all-wheel concept is supported by the internal-combustion engine having the crankshaft system comprising two crankshafts, which crankshafts rotate in opposite directions by way of synchronization gears. This method of construction results in excellent operating characteristics of the internal-combustion engine, specifically with respect to smooth running, consumption and stability. In a constructively skillful manner, it is achieved that the output of the crankshaft system toward the first set of V-pulleys takes place from the first end region of the crankshaft system, and that, in the second end region of the crankshaft system, the crankshafts are equipped with flywheels. It should be stressed in this context that a power take-off shaft for the drive of accessories is provided on at least one crankshaft.

It is useful that the second drive shaft extends below a cylinder crankcase of the internal-combustion engine, and that the internal-combusting engine extends diagonally with respect to a horizontal line for guiding the second drive shaft past the cylinder crankcase.

It is a sophisticated construction that a clutch is connected into a driving shaft between the first end region of the crankshaft system and the first set of V-pulleys. This clutch may be a shifting clutch, a centrifugal clutch or the like. Finally, it is creatively advantageous that the axes rotation of the crankshafts as well as of the first and second drive shafts are oriented in the longitudinal direction of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
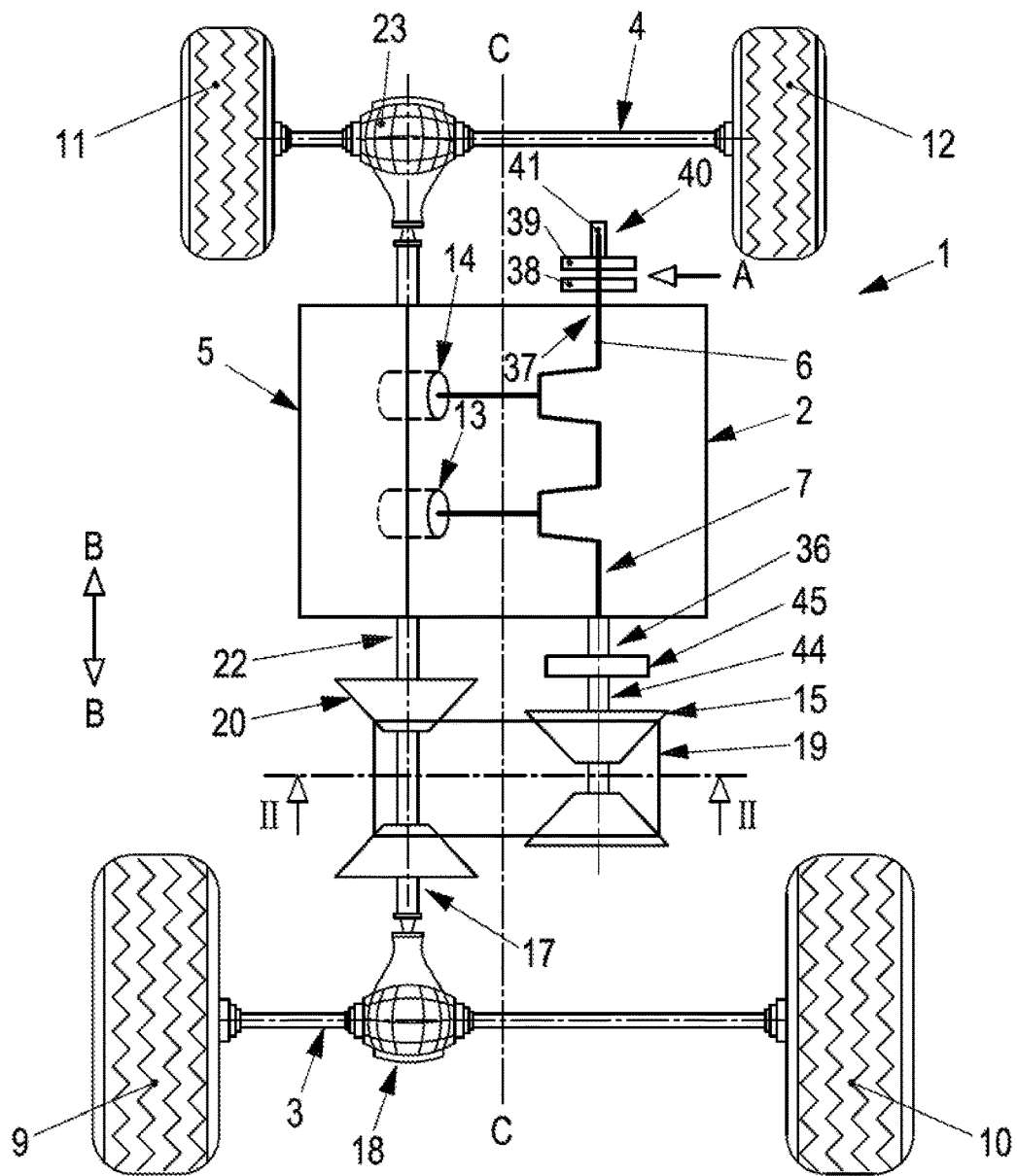
FIG. 1 is a schematic top view of the drive unit installed in a motor vehicle having an all-wheel drive.
Figure 2:
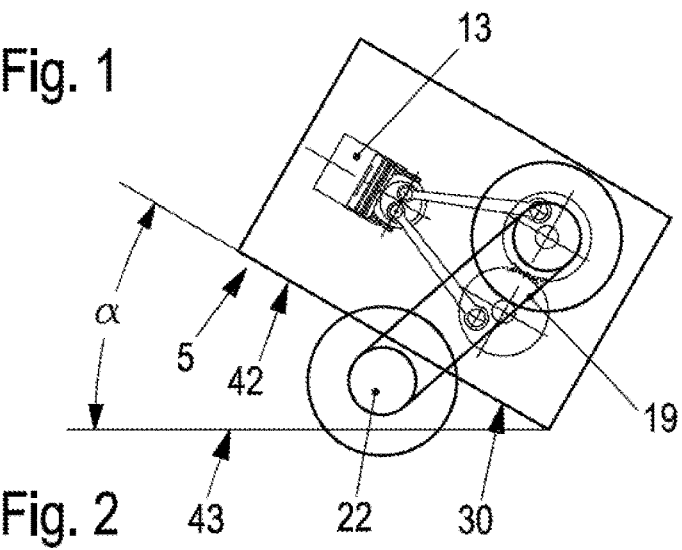
FIG. 2 is a schematic sectional view approximately according to Line II-II of FIG. 1.

A motor vehicle 1 having an all-wheel drive is suitable for use in the agriculture and construction sectors and/or for civil and disaster protection tasks and is equipped with a drive unit 2, driven between a first wheel axle 3—rear axle—and a second wheel axle 4—front axle—, which driving axles 3 and 4 are arranged in the longitudinal direction B-B at a mutual distance. The drive unit 2 has an internal-combustion engine 5 of the piston type having at least one horizontally extending crankshaft 6 of a crankshaft system 7, which crankshaft 6 extends in the longitudinal direction B-B of the vehicle. The crankshaft 6 acts upon a continuously variable transmission system 8 (CVT construction), which drives wheels 9, 10 and 11, 12 of the first wheel axle 3 and of the second wheel axle 4.

The crankshaft 6 of the crankshaft system 7 is caused to rotate by pistons 13, 14 of the internal-combustion engine 5 and interacts with a first set of V-pulleys 15 of the transmission system 8, which, by way of a first drive shaft 17, interacts with a first differential 18 of the first wheel axle 3. The first set of V-pulleys 15, by means of an endless member 19 in the shape of a push belt, is in an operative connection with a second set of V-pulleys 20 of the transmission system 8, which, with the interposition of a second drive shaft 22), influences a second differential 23 of the second wheel axle 4.

Figure 3:
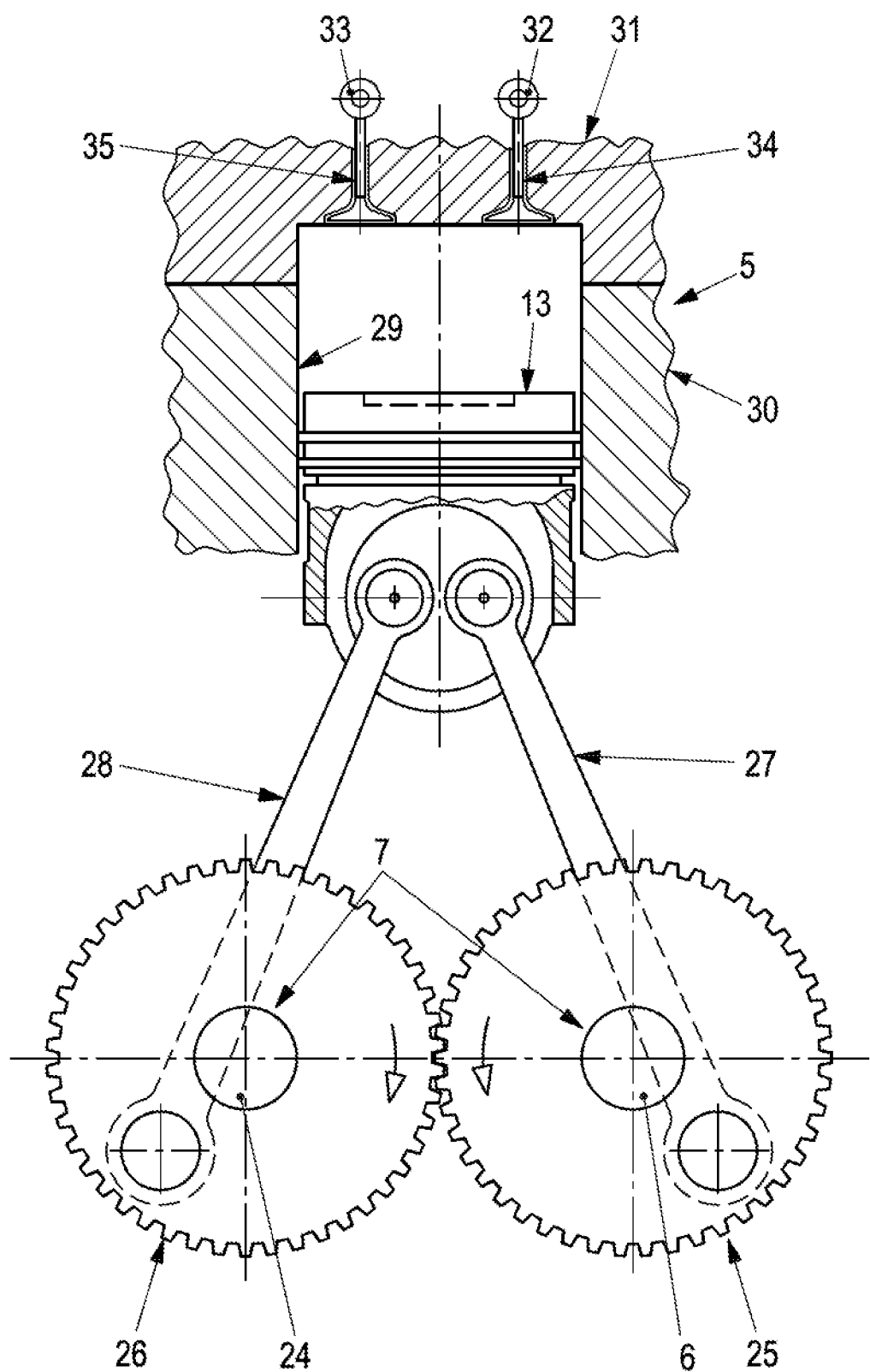
FIG. 3 is a schematic cross-sectional view of the internal-combustion engine, for example, according to FIG. 2.
Figure 4:
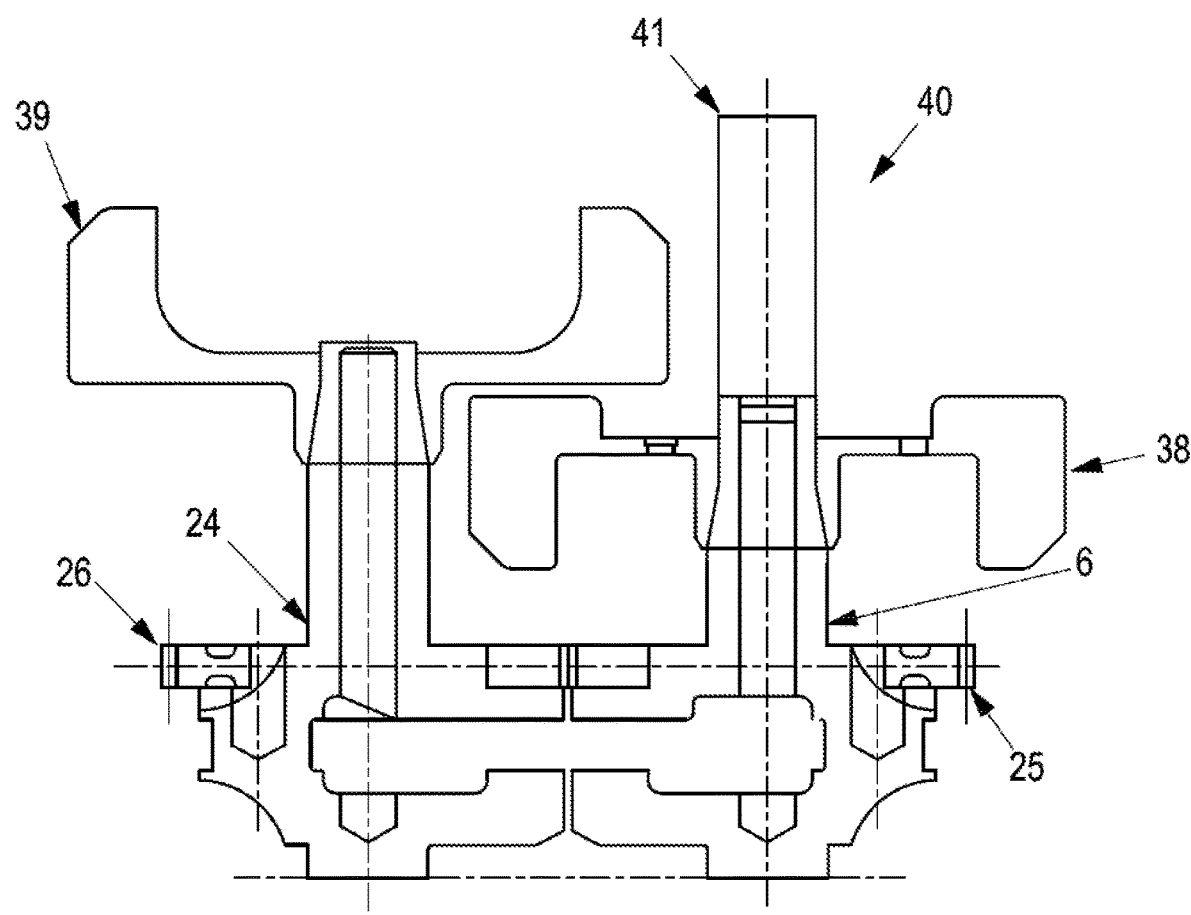
FIG. 4 is a view in the direction of the arrow A of FIG. 1.

The crankshaft system 7 of the internal-combustion engine 5 comprises two parallel crankshafts, specifically the above-mentioned crankshaft 6 and an additional crankshaft 24 (FIG. 3). Both crankshafts 6 and 24 interact by means of synchronization gears 25 and 26 such that the crankshafts 6 and 24 rotate in opposite directions. The crankshafts 6 and 24 are driven by connecting rods 27 and 28, which are each coupled with one of the pistons 13 and 14. The piston 13 moves back and forth in a borehole 29 of a cylinder crankcase 30, the cylinder crankcase 30 being covered by a cylinder head 31, which accommodates gas exchange valves 34 and 35 operated by camshafts 32, 33. This internal-combustion engine 5 is particularly efficient in that it operates according to the Diesel principle and is equipped with an exhaust gas turbocharger device, possibly also with direct injection (common rail system) (not shown). An internal-combustion engine of this type is indicated in German Patent Document DE 10 2011 104 496 B4.

The output of one of the crankshafts 6 or 24 of the crankshaft system 7 of the internal-combustion engine 5 toward the first set of V-pulleys 15 takes place from a first end region 36 of the above-mentioned crankshaft system 7. On the second end region 37 of the crankshaft system 7 spaced away from the first end region 36 or of the crankshafts 6 and 24, flywheels 38 and 39 are provided on the latter. In the axial direction of the crankshafts 6 and 24, the flywheels 38 and 39 are arranged in a mutually offset manner and mutually overlap in regions. An elongation 40 is provided on at least the crankshaft 6 and is used as a power take-off shaft 41 for driving accessories.

The first and second drive shaft 17 and 22 are oriented in the longitudinal direction B-B of the vehicle and extend at a symmetrical or asymmetrical distance with respect to a longitudinal center plane C-C of the motor vehicle 1. The second drive shaft 22 extends below an outer case wall 42 of the cylinder crankcase 30 of the internal-combustion engine 5, in which case, for guiding the second drive shaft 22 past the cylinder crankcase 30 or the case wall 42, the latter or the internal-combustion engine 5 extends diagonally, i.e. at an acute angle $\alpha$, with respect to a horizontal line 43. Finally, a driving shaft 44 acts between the first end region 36 and the first set of V-pulleys, into which driving shaft 44 a clutch 45 is connected. The clutch 45 is formed by a shifting clutch, a centrifugal clutch or the like.

LIST OF REFERENCE SYMBOLS

1 Motor vehicle
2 Drive unit
3 First wheel axle
4 Second wheel axle
5 Internal-combustion engine
6 Crankshaft
7 Crankshaft system
8 Transmission system
9 Wheel, first wheel axle
10 Wheel, first wheel axle
11 Wheel, second wheel axle
12 Wheel, second wheel axle
13 Piston
14 Piston
15 First set of V-pulleys
17 First drive shaft
18 First differential
19 Endless member
20 Second set of V-pulleys
22 Second drive shaft
23 Second differential
24 Additional crankshaft
25 Synchronization gear
26 Synchronization gear
27 Connecting rod
28 Connecting rod
29 Borehole
30 Cylinder crankcase
31 Cylinder head
32 Camshaft
33 Camshaft
34 Gas exchange valve
35 Gas exchange valve
36 First end region
37 Second end region
38 Flywheel
39 Flywheel
40 Elongation
41 Power take-off shaft
42 Case wall
$\alpha$ Angle
43 Horizontal line
44 Driving shaft
45 Clutch The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive unit for a motor vehicle having an all-wheel drive, the motor vehicle having a first wheel axle and a second wheel axle, comprising:
    an internal-combustion engine with a crankshaft system arranged between the first wheel axle and the second wheel axle, the crankshaft system having at least one horizontally oriented crankshaft, wherein at least one piston of the internal-combustion engine causes rotation of the crankshaft;
    a continuously variable transmission system acted upon by the crankshaft, the transmission system driving wheels of the first wheel axle and the second wheel axle;
    a first set of V-pulleys of the transmission system interacting with the crankshaft, wherein the first set of V-pulleys is connected with a first differential of the first wheel axle via a first drive shaft; and a second set of V-pulleys operatively connected with the first set of V-pulleys via an endless member, wherein the second set of V-pulleys influences, with an interposition of a second drive shaft, a second differential of the second wheel axle, wherein the crankshaft system of the internal-combustion engine comprises two parallel crankshafts, which are influenced by the at least one piston, which crankshafts interact by way of synchronization gears and rotate in opposite directions, wherein an output of the crankshaft system takes place toward the first set of V-pulleys from a first end region of the crankshaft system, and in a second end region of the crankshaft system, the crankshafts are equipped with flywheels.

2. The drive unit according to claim 1, wherein a power take-off shaft is provided adjacent to the second end region as an elongation of at least one of the crankshafts of the crankshaft system.

3. The drive unit according to claim 1, wherein between the first end region of the crankcase system and the first set of V-pulleys, a clutch is connected into a driving shaft.

4. The drive unit according to claim 1, wherein axes of rotation of the crankshafts and of the first as well as the second drive shafts are oriented in a longitudinal direction of the vehicle.

5. A drive unit for a motor vehicle having an all-wheel drive, the motor vehicle having a first wheel axle and a second wheel axle, comprising:

an internal-combustion engine with a crankshaft system arranged between the first wheel axle and the second wheel axle, the crankshaft system having at least one horizontally oriented crankshaft, wherein at least one piston of the internal-combustion engine causes rotation of the crankshaft;

a continuously variable transmission system acted upon by the crankshaft, the transmission system driving wheels of the first wheel axle and the second wheel axle;

a first set of V-pulleys of the transmission system interacting with the crankshaft, wherein the first set of V-pulleys is connected with a first differential of the first wheel axle via a first drive shaft; and a second set of V-pulleys operatively connected with the first set of V-pulleys via an endless member, wherein the second set of V-pulleys influences, with an interposition of a second drive shaft, a second differential of the second wheel axle, wherein the second drive shaft extends below a cylinder crankcase of the internal-combustion engine.

6. The drive unit according to claim 5, wherein for guiding the second drive shaft past the cylinder crankcase, the internal-combustion engine extends diagonally with respect to a horizontal line.

* * * * *